3,040,018
PURIFICATION AND STABILIZATION OF CASEIN
Winston Harold Wingerd, Elgin, Ill., assignor to The Borden Company, New York, N.Y., a corporation of New Jersey
No Drawing. Filed Dec. 24, 1959, Ser. No. 861,788
9 Claims. (Cl. 260—120)

This invention relates to casein and caseinates of improved and stabilized flavor.

Many attempts have ben made to provide commercial casein and caseinates that are bland initially and remain so on long storage. So far these attempts have not been successful. These products even of food grade still develop off flavor characteristics after one or two months in storage and have in fact an initial flavor that is not as bland as desired.

The present invention provides casein, alkali metal caseinates and the like that are satisfatcory in meeting the requirements as to original flavor and stability thereof in tests that have now exceeded 5 months.

Briefly stated, the present invention comprises the herein described process and product of treating of casein in aqueous dispersion with ascorbic acid, the action being improved by ferrous iron.

In the commercial embodiment of the invention, the casein is treated in a medium at a pH above the isoelectric point of casein in contact with elemental oxygen and the composition undergoing treatment is warmed so as to shorten the time required. Finally the insoluble material of extremely undesirable flavor so separated from the casein is removed, the insoluble material is discarded, and the filtrate is processed to give either casein or caseinate as may be required for use.

Proceeding as described, I have made casein and sodium caseinate, for example, that were found to be superior in organoleptic tests to specimens produced in conventional manner and also to show no change in flavor after 5 months at 100° F. By contrast commercial samples of so-called bland casein products were found to develop pronounced off flavor characteristics after only 1.5 to 2 months at the same temperature.

"Flavor," as the term is used herein, includes elements of both taste and odor.

My improved casein and caseinate are useful as admixtures in bread, milk shakes and other beverages, dessert products, soups and cereals that now use casein or caseinate as admixtures or components. In such use the conventional casein or caseinate now used is replaced by an equal weight of my bland casein or caseinate, respectively, without change of conditions of compounding or subsequent treatment.

I consider the improved flavor to be due to oxidation of the lipid material which is tightly adsorbed on or complexed with the casein. One fraction i.e., ⅓ to ½ of the lipid, is converted by the oxidation to an insoluble lipid-protein complex which is removable by filtration, as by centrifugation. The remainder of the lipid is degraded so that low molecular weight compounds, which normally form in the dried product on storage and contribute to off odors and flavors, are liberated and washed out of the casein before drying.

The lipid content of the casein is reduced to less than 1.5% and normally to about one-half to two-thirds of the original lipid by this process, New Zealand casein contains about 2% lipid. After processing the casein or caseinate will contain about 1% to 1.3% lipid. The centrifuge cake of insolubilized material, on the other hand, averages about 5% lipid. The lipid content of the casein is determined by extraction by the standard Mojonnier extraction procedure.

The TBA value is a measure of the red pigment formed in the 2-thiobarbituric acid determination of oxidative rancidity. The method used is that of Ottolenghi, Arch. Biochem. Biophys. 79, 355–363, 1959. It measures here the amount of low molecular weight compounds produced from the lipid by the oxidation, more exactly the malonaldehyde or precursors produced but these are considered to be approximately proportional to the other breakdown products.

The TBA values are determined as follows:

(1) To 4 ml. of 5% caseinate, add 2 ml. of 35% trichloroacetic acid and 2 ml. of 0.75% aqueous 2-thiobarbituric acid.

(2) Place in boiling water bath for 15 minutes.

(3) Cool, replace evaporation losses and add 4 ml. of 70% trichloroacetic acid.

(4) Mix well and allow to stand 20 minutes, to extract color absorbed to protein.

(5) Centrifuge and read supernatant solution in colorimeter at 535 mu.

(6) Multiply the optical density so determined by 100. This gives the TBA value.

As to materials, all used are non-toxic in the proportions introduced and of food grade when the product is to be edible.

The casein is the acid precipitated or isoelectric curd prepared in usual manner and used in either fresh, i.e., moist, or dried condition.

The ascorbic acid is the commercially available material.

The iron is introduced in the form of a ferrous salt soluble in water of the pH at the time of treatment as at 6.5 or lower. Certain specimens of casein, including those that have come to contain a trace of ferrous iron, as by contamination or for other reason, do not require additional iron.

Ordinarily however we find it advantageous to add the ferrous salt. Examples that are satisfactory and illustrate the class to be selected are ferrous chloride, gluconate, malate and sulfate. Ferrous hydroxide or carbonate may be used and dissolved in the casein dispersion of acid pH, to give a salt.

The alkali used to raise the pH of the casein above the isoelectric point is an alkali metal alkali, i.e. an alkaline compound of an alkali metal such as sodium and potassum bicarbonates, carbonates, hydroxides added cautiously and in dilute form so as to avoid local excesses, secondary phosphates, tripolyphosphates and the like or mixtures thereof. Thus we have found particularly good type of curd, forming after the addition of acid, that promotes subsequent filtration when the alkali used is a mixture of sodium carbonte and tetrasodium pyrophosphate in the proportion of about 1 part of the sodium carbonate to 4 parts of the pyrophosphate. Besides promoting better drainage of the washed curd, this particular alkali mixture seems to be somewhat superior in the flavor and stability characteristics produced in the finished product. The alkali ordinarily used is sodium bicarbonate.

For the acid to be added as stated herein there is used to advantage relatively inexpensive acids such as hydrochloric, phosphoric, lactic, acetic or sulphuric acid. The acid used is suitably diluted with water and mixed in thoroughly, so as to avoid temporary local excesses. The dilution required or the care in admixing is particularly large in the case of certain acids such as sulfuric or hydrochloric.

The separation of the insoluble material from the casein, which is a feature of my treatment, is promoted by the fine distribution of air or other form of elemental oxygen through the dispersion at the stage in which the separation is to occur. For this purpose I use ordinarily an air sparger of conventional type.

Proportions of the various materials to be used that are permissible and that are recommended for commercial practice, respectively, are shown in the following table. Proportions in this table and elsewhere are shown by weight and on the dry basis, unless specifically stated to the contrary.

| Component | Parts by Weight | |
|---|---|---|
| | Permissible | Commercial |
| Casein | 100 | 100 |
| Ascorbic acid | 0.1–2 | 0.2–0.5 |
| Ferrous salt calculated as Fe | 0.0001–0.1 | 0.005–0.02 |

Alkali and alternately acid are introduced as required to establish the pH conditions recited herein.

The elemental oxygen when used is in excess of the amount absorbed by the solution during the sparging thereof, as with the air or oxygen.

Larger proportions than shown of the ascorbic acid and iron are unnecessary and uneconomical. If only one of these materials is used, the proportion required for best flavor and stabilization introduces the complication of inferior quality or objectionably increased cost of product. In tests with the iron salt alone or acting synergistically with varying proportions of ascorbic acid, the effectiveness of the treatment of casein in aqueous dispersion at a pH of about 6.6 for 1 hour at 175° F. were found to be as follows:

Effectiveness as measured by thiobarbituric acid values (described above)

Additive used, parts for 100 casein:
    None (5% New Zealand casein) _____ 2.0
    $FeCl_2 \cdot 4H_2O$, 0.04 (0.011Fe) _____ 3.3
    Ascorbic acid, 0.20 _____ 4.3
    Ascorbic acid, 0.20+$FeCl_2 \cdot 4H_2O$, 0.04 _____ 6.2
    Ascorbic acid, 0.40+$FeCl_2 \cdot 4H_2O$, 0.04 _____ 8.8
    Ascorbic acid, 0.80+$FeCl_2 \cdot 4H_2O$, 0.04 _____ 7.4
    Ascorbic acid, 1.60+$FeCl_2 \cdot 4H_2O$, 0.04 _____ 7.0

By using both the ascorbic acid and the iron salt, there is obtained a high and a very satisfactory TBA value without using more than about 0.01% of $Fe^{++}$. When substantially more iron is used, discoloration begins to appear in the product.

Conditions of operation include stirring the casein in dispersion in water with sodium bicarbonate or other alkali as stated, in amount to establish the pH above the isoelectric point of casein, as within the pH range 6–7 and ordinarily 6.3–6.6. The whole dispersion, including also the admixed ascorbic acid and the trace proportion of ferrous iron, is maintained in warm condition to accelerate the reaction. Thus the temperature is maintained for reasonably rapid results at a temperature between 120° F. and that of objectionable denaturing of the casein. For commercial results, I use about 150°–190° F., 160°–180° being preferred. The temperature must be high enough to destroy all of the ascorbic acid in the holding period of about 0.5–3 hours. Into this warm dispersion gaseous oxygen, ordinarily as fine bubbles of air, is sparged in so that the subdivided oxygen has intimate contact with the dispersed casein. The oxygen promotes separation of undesired material from the casein in form that is subject to satisfactory and rapid filtration, that is, separation by relative movement between the solid and liquid phases without change of state.

The treatment of the dispersion is continued until substantially no insoluble material separates therefrom. This requires usually about 0.5–3 hours. The whole is then filtered in conventional manner, a super centrifuge form of filtration being particularly satisfactory in separating the precipitated solid material from the dispersion of flavor improved caseinate which passes through the centrifuge in the liquid phase of the composition.

The insoluble material thus separated is of bad flavor and becomes worse on aging. It is discarded. It amounts ordinarily to about 1.8%–2% of the casein.

The said filtrate is then spray dried in the event that it is to be used in the form of the metal caseinate, here the solid caseinate.

When the casein is to be made from the filtrate, the filtrate is acidified, as with food grade hydrochloric acid to pH 4.2–4.4, 4.3 being recommended for the pH at all times during the washing and filtration. The casein so precipitated is then separated as by settling and decantation, this being considered also as a form of filtration.

The curd is drained finally to give a moist mass of casein. The curd so made is either dried, the procedure selected depending upon the grade of casein that is to be made, or used in wet condition.

The invention will be further illustrated by description in connection with the following specific examples of the practice of it.

*Example 1*

Into a tank there were introduced with agitation 3,000 parts of water, 100 parts of New Zealand (isoelectric) casein and 4 parts of sodium bicarbonate.

The resulting dispersion of pH about 6.5 was warmed to 170°–175° F. with separated steam. Then 0.2 part of ascorbic acid and 0.016 part of ferrous chloride ($FeCl_2 \cdot 4H_2O$) were introduced and the temperature was maintained for 1 hour, with continuous agitation. An insoluble material of offensive taste and odor separated from the casein and at the end of the hour this separation was substantially complete.

The resulting mixture was filtered, to remove the insoluble material, by being pumped through a Sharples Super centrifuge at the rate of 250 gallons per hour, with a bowl change for every 300 gallons of effluent therefrom.

The effluent containing the treated caseinate was cooled to 100°–110° F. and mixed with 6.4 parts of 22° Bé. hydrochloric acid of food grade, the whole being then stirred. The final pH was 4.3. The stirring was discontinued after 5 minutes and the casein was settled as a wet curd for 15 minutes. The supernatent liquor was decanted as completely as possible and replaced by an equal volume of wash water. The mixture was stirred till uniform and the pH adjusted to 4.5 by adding the necessary small amount of hydrochloric acid. The curd was settled for 15 minutes and the liquid decanted. The addition of water, acidifying to pH 4.5, settling, and decantation were again repeated. This washing process removes soluble salts. The final volume of the curd, for 100 pounds of casein used initially, was 80–90 gallons, containing about 8–10 or more pounds of water to 1 pound dry weight of casein.

The curd is dried in any usual commercial manner for drying casein curd. The pH of the dried product, as measured in a 3% aqueous dispersion, was 5.67.

*Example 2*

The composition and procedure of Example 1 are followed except that air is sparged into the warm mix during the holding at 170°–175° F. The result is an increase in the rate of reaction, improvement in the rate of sedimentation of the insoluble material separated from the casein during the reaction, and better clarification by the centrifuge.

*Example 3*

The composition and procedure of Examples 1 and 2 are used in turn, except that the sodium bicarbonate there employed is replaced by a mixture of 0.9 part of sodium carbonate and 4 parts of tetrasodium pyrophosphate. This substitution makes the casein curd, when subsequently precipitated, somewhat more spongy and better draining.

*Example 4*

Modified casein is made as follows: The wet casein curd made as described in Example 1, just before the final drying step, is mixed with 0.55 part sodium bicarbonate for 100 parts of casein. This raises the pH to about 5.55. The whole is then stirred into a slurry and pumped through a Fitz mill (a comminuter) with an 80-mesh screen over the outlet. The substantially uniform dispersion so made is then dried in any conventional spray dryer for food products such as milk, here actually a Rogers spray dryer.

The product is a soft powder that disperses readily in water to give a pH of 5.95 measured as above and avoids the gluey characteristics usual in casein.

*Example 5*

Sodium caseinate is made as follows: Sodium bicarbonate (3.3 parts for 100 of dry casein) are stirred into the wet casein curd after the final washing and draining and just before drying. The mixture is suitably warmed to about 160° F. to facilitate solution of the casein. The whole is then spray dried as described. The product, tested as in Example 1, had a pH of 6.5.

Instead of the wet curd there may be used dried casein. In that event, the dry casein is slurried with water before the sodium bicarbonate is admixed.

*Example 6*

The compositions and procedures of the Examples 1–5 are followed, in turn, except that the alkali, acid, and ferrous salt there used are replaced, in turn and respectively, by any one of the other alkalies, acids, or ferrous salts shown therein, the alkali and acid being used in such amounts as to give the pH stated for the various steps and the iron salt in amount to provide ferrous ion in proportion supplied by the 0.016 part of hydrated ferrous chloride.

The products of all the examples are bland in flavor as produced and the taste is stable in storage, as stated.

*Example 7*

The procedure of Example 1 is followed except that the ferrous chloride is omitted. The product is improved moderately in original flavor and stability thereof on aging.

It will be understood that it is intended to cover all changes and modifications of the examples of the invention herein chosen for the purpose of illustration which do not constitute departures from the spirit and scope of the invention.

I claim:
1. In making caseinates of flavor that is bland initially and stabilized against deterioration on storage, the process which comprises mixing 100 parts by weight of casein, a non-toxic alkaline compound of an alkali metal in amount to establish the pH above the isoelectric point for casein and to cause dispersibility thereof in the water, water in amount to provide the medium for dispersion of the casein, and approximately 0.1–2 parts of ascorbic acid, maintaining the resulting casein dispersion at a temperature of about 120°–190° F. until a water insoluble lipid protein complex precipitates from the casein in contact with the ascorbic acid and until no further substantial amount of such insoluble material precipitates, and then filtering the precipitated complex from the remaining casein.

2. The process of claim 1 which includes passing elemental oxygen in subdivided form through the said dispersion at about 120°–190° F.

3. The process of claim 1 which includes admixing a non-toxic acid into casein remaining after precipitating of the insoluble material and in amount to establish the pH at approximately the isoelectric point for casein, filtering out the thus precipitated casein, and then washing the casein with water, to remove soluble salts.

4. The process of claim 3 which includes mixing into the washed casein a non-toxic alkaline compound of an alkali metal in amount to convert the washed undried material to a flowable slurry and then spray drying the slurry.

5. In making casein of initially bland and stabilized flavor, the process which comprises stirring approximately 100 parts by weight of casein in water, in amount to provide the medium for dispersion of the casein, with a non-toxic alkaline compound of an alkali metal in amount to establish the pH within the approximate range 6–7, so as to cause the casein to be intimately dispersible in the water, 0.1–2 parts of ascorbic acid, and 0.0001–0.1 part of a non-toxic water soluble ferrous salt calculated as iron, maintaining the resulting dispersion at a temperature of about 120°–190° F., passing oxygen in elemental form therethrough until water insoluble material precipitates from the dispersion in filterable form and until no further substantial amount of said insoluble material precipitates, filtering the said insoluble material so separated from the remaining dispersion, adding a non-toxic acid to the thus separated liquid phase in proportion to establish the pH at approximately the isoelectric point to cause precipitation of casein, and then washing and drying the precipitated casein with water at a pH of about 4.2–4.4.

6. The process of claim 5, the said alkaline compound used being sodium bicarbonate.

7. The process of claim 5, the said ferrous salt being ferrous chloride.

8. The process of claim 5, which comprises adding to the precipitated casein a non-toxic alkaline compound of an alkali metal in amount to establish the pH above the isoelectric point for casein and convert the casein to water dispersible form, and then drying the resulting dispersion of alkali metal caseinate.

9. The process of claim 1 which includes admixing 0.0001–0.1 part of a non-toxic water soluble ferrous salt calculated as iron before said maintaining of the resulting dispersion in warm condition.

References Cited in the file of this patent
UNITED STATES PATENTS

| | | |
|---|---|---|
| 745,097 | Eberhard | Nov. 24, 1903 |
| 2,142,093 | Clickner | Jan. 3, 1939 |
| 2,554,479 | Wolff | May 22, 1951 |
| 2,754,292 | Henderson et al. | July 10, 1956 |

OTHER REFERENCES

Scherer: "Casein," Scott, Greenwood and Son, London (1921), 3rd Ed. page 189.

Rose et al.: "The Condensed Chemical Dictionary," Reinhold Publishing Corp., New York (1956), 5th Ed., page 115.